US005598006A

United States Patent [19]

Stringa

[11] Patent Number: 5,598,006

[45] Date of Patent: Jan. 28, 1997

[54] INSTALLATION FOR QUALITY CONTROL OF PRINTED SHEETS, ESPECIALLY SECURITY PAPER

[75] Inventor: Luigi Stringa, Trento, Italy

[73] Assignee: De La Rue Giori S.A., Lausanne, Switzerland

[21] Appl. No.: 374,889

[22] Filed: Jan. 19, 1995

[30] Foreign Application Priority Data

Feb. 4, 1994 [IT] Italy ................................ MI94A0198

[51] Int. Cl.$^{6}$ .................................................... G01N 21/88

[52] U.S. Cl. ....................... 250/559.46; 250/556; 356/71; 356/430

[58] Field of Search .............................. 250/556, 559.45, 250/559.46; 356/445, 429, 430, 71

[56] References Cited

U.S. PATENT DOCUMENTS

| | | | |
|---|---|---|---|
| 3,814,943 | 6/1974 | Baker et al. . | |
| 3,916,194 | 10/1975 | Novak et al. . | |
| 4,163,157 | 7/1979 | Guignard et al. . | |
| 4,231,014 | 10/1989 | Ponzio . | |
| 4,293,776 | 10/1981 | Sick et al. . | |
| 4,319,137 | 3/1982 | Nakamurra et al. . | |
| 4,587,434 | 5/1986 | Roes et al. | 250/556 |
| 4,723,072 | 2/1988 | Naruse | 235/454 |
| 5,034,616 | 7/1991 | Bercovitz | 250/556 |
| 5,381,019 | 1/1995 | Sato | 250/556 |

FOREIGN PATENT DOCUMENTS

| | | |
|---|---|---|
| 2428287 | 1/1980 | France . |
| 3500650A1 | 7/1985 | Germany . |
| 2064111 | 6/1981 | United Kingdom . |
| 2107911 | 5/1983 | United Kingdom . |

*Primary Examiner*—Edward P. Westin
*Assistant Examiner*—Stephen Calogero
*Attorney, Agent, or Firm*—Kane, Dalsimer, Sullivan, Kurucz, Levy, Eisele and Richard, LLP

[57] ABSTRACT

The installation for quality control of printed sheets (1) comprises means (8–13) for transferring said sheets, and cameras (2, 4, 6) for checking the print quality. The transfer means (8–13) are designed to transport the sheets in a plane and to allow the print quality of each of the faces of the sheet to be checked as well as a quality check using transparency to be carried out in succession and in a single pass. The means for checking each face are two cameras (2, 3) located on either side of said plane at two offset locations, the transfer means being designed to leave an open window at the side of each camera. A third camera (6) carries out the check using transparency.

7 Claims, 4 Drawing Sheets

FIG. 2c
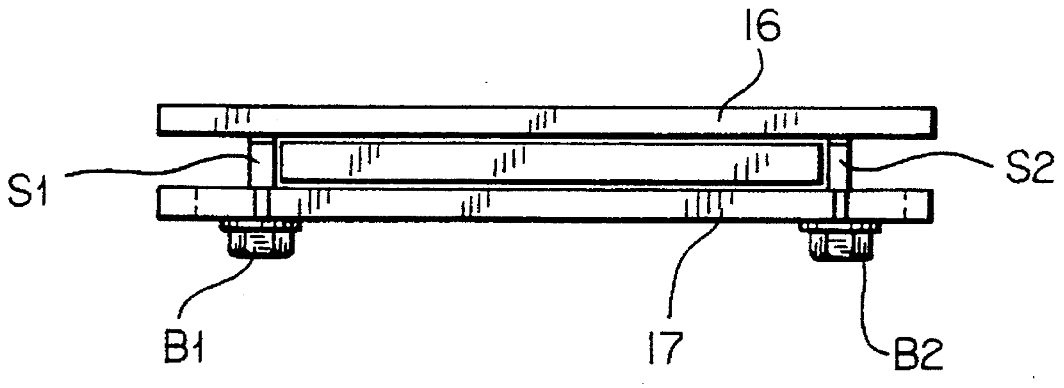
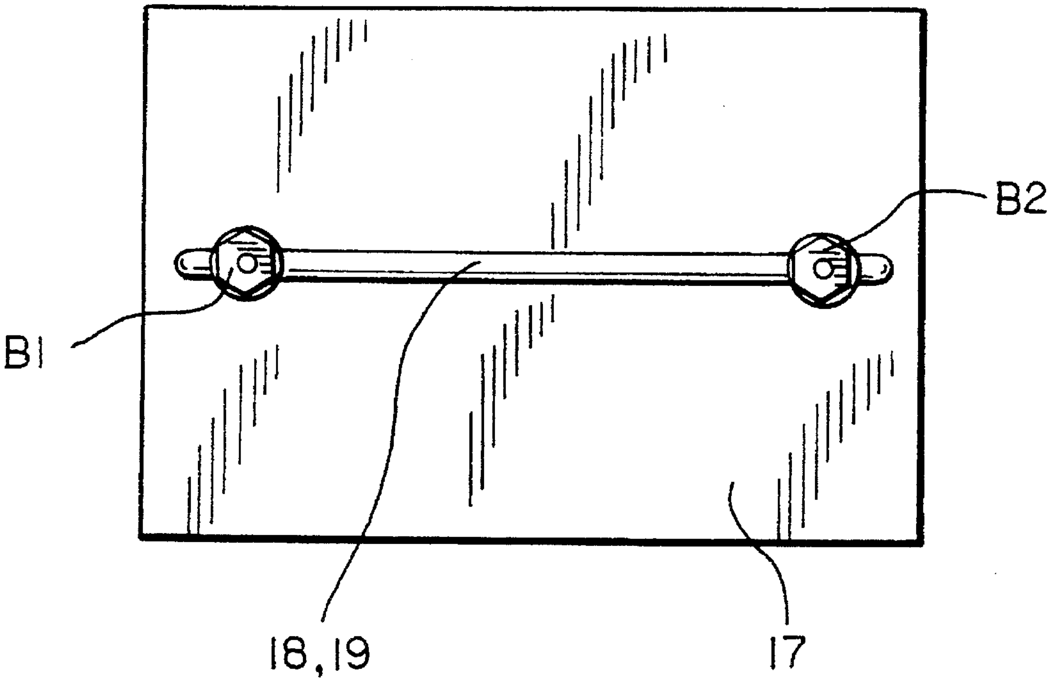
FIG. 2d

INSTALLATION FOR QUALITY CONTROL OF PRINTED SHEETS, ESPECIALLY SECURITY PAPER

FIELD OF THE INVENTION

The present invention relates to an installation for quality control of printed sheets, especially security paper, comprising means for transferring said sheets and means for checking the print quality.

PRIOR ART

Quality control of a piece of paper printed on both faces requires each of its faces to be checked by reflection, as well as a check using transparency. The transparency check makes it possible to check the quality of the paper, the register of the images, the possible presence of the watermark. If the sheet is printed only on one face, one check using reflection and one using transparency are carried out. In the installations for quality control of printed sheets either matrix cameras or scanning cameras are used. When matrix cameras are used, each of the three checks, namely the check of the two faces of the printed sheet (using reflection) and the check using transparency, requires a long transport section at least equal to a sheet, which leads to a bulky and expensive installation.

When using scanning cameras, a cylinder is used over which the sheet passes for checking one face. Such a cylinder is described in EP-A-559,615 of the applicant.

An installation for transferring sheets in the flat state, this installation being equipped with gripper bars making it possible to grasp the edge of a sheet to be checked and slide it over support bars for a transparency check of a narrow zone is described in EP-A-0,559,616 of the applicant. Suction nozzles are provided on one side of the checking slit on the support bars to allow the checked sheet to be kept flat.

It has proved to be the case that for checking the print quality of a printed sheet, the latter must preferably be completely flat on a planar surface, rather than on a cylinder, and also on a continuous surface which, on the one hand, makes sure that the sheet is perfectly flat and, on the other hand, makes sure that the background is homogeneous, at least optically.

SUMMARY OF THE INVENTION

The object of the present invention is to provide an installation for checking the print quality of a printed sheet making it possible to achieve the above-mentioned conditions, and in addition to obtain a compact installation.

The installation according to the invention is described by the characterizing clause of claim 1.

The advantages of the installation according to the invention are as follows:

For checking the print quality of a security paper, such as a banknote, currency paper, etc., especially using reflection, the sheet is held perfectly flat in front of the camera which makes it possible to improve the reliability and quality of the checking.

With travel taking place in a plane which is preferably horizontal, the transport means used are the same both for the quality check using reflection and the one using transparency, which makes it possible to rationalize the manufacture and carry out the three checks in a single pass.

According to the preferred embodiment, linear array cameras (line by line) are used, which makes it possible to have narrow reading windows. Indeed, it is sufficient for the window for checking one face using reflection to have a length corresponding to a fraction of the length of the sheet. The length of the window is a function of the resolution of the camera used and it must allow the illumination and reflection of the checked zone. Thus, a very compact checking installation may be obtained, the two windows for reflection checking each requiring only a fraction of the length of a sheet.

According to a preferred embodiment, the transfer means are two superposed conveyor belt devices, the sheets being gripped between these devices which makes it possible to make sure that the sheet is truly flat. For checking the print quality using reflection at the locations where each of the cameras providing for this check can be found, and over a length corresponding to a length of the window, one of the conveyor belts is broken and the sheet is held on the other belt by suction, this simultaneously ensuring that it is held perfectly flat and also providing a continuous background which allows optical checking under optimal conditions.

According to another alternative embodiment, instead of using conveyor belts, use is made of superposed guiding plates and of pairs of rollers allowing the sheets to be advanced, the spacing between the rollers being less than the length of the sheets to be checked. In front of the cameras for checking using reflection, one of the plates has a bit missing over a length equal to the length of the window, the second plate holding the sheet truly flat by suction, which also makes it possible to ensure a perfectly flat position and a continuous background for checking quality.

For the purpose of avoiding the suction holes being able to disrupt the optical homogeneity of the support on which the sheet can be found, when checking using reflection, the suction holes are oblique, their axis forming an angle of 30°–45° relative to the transport plane. This inclination of the holes allows the surface on which the sheet is to be found to be homogeneous from the optical point of view.

The check of transparency is done using, facing said camera, a pair of superposed plates which are equipped with a slit perpendicular to the travel of the sheets, which ensures a perfectly flat position of the sheet. At this location, it is also possible to provide lateral guidance of the sheets as they pass between the plates to prevent them from becoming crooked.

BRIEF DESCRIPTION OF THE DRAWINGS

The invention will be described in more detail with the aid of the appended drawing.

FIG. 2*c* shows a lateral view of the device shown in FIG. 2*a*. FIG. 2*d* shows a bottom view of the same device.

DESCRIPTION OF THE PREFERRED EMBODIMENT

Figure 1:
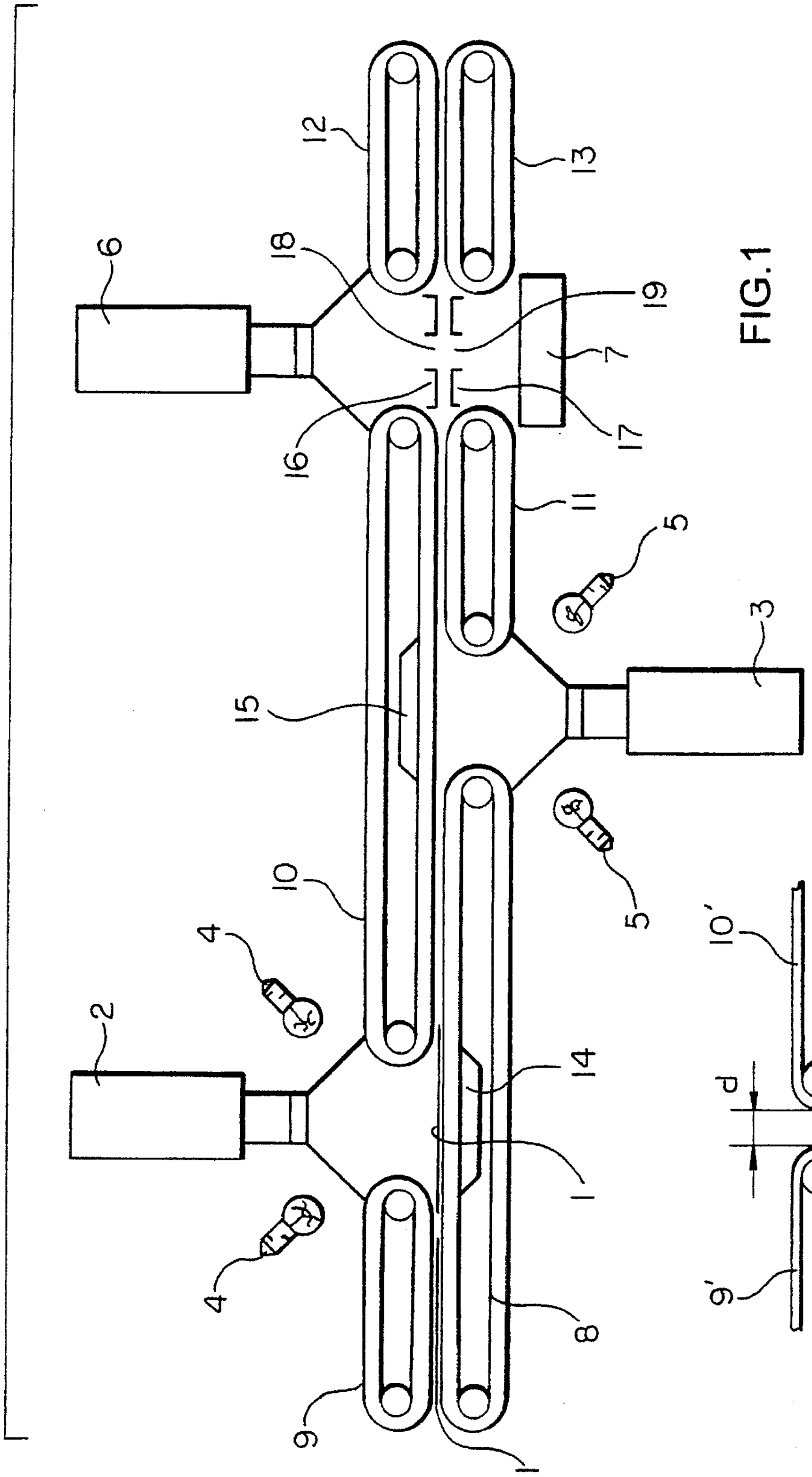
FIG. 1 is a diagrammatic side view of an installation with conveyor belts.

The device of FIG. 1 comprises transfer means for sheets 1 which are printed on both sides and intended to be checked by two cameras 2, 3 which carry out a check on the print quality of each face of the sheet 1 using reflection, illuminating means 4, 5 being provided for this purpose, and a camera 6 for checking quality using transparency, a light source 7 being located on the other side of the camera.

The means for transferring the sheet 1 are composed of superposed conveyor belts 8, 9, 10, 11, 12, 13. The superposed belts are made of or covered with an elastic substance and are in contact. In this way the sheet is gripped between the two belts and remains truly flat. Nevertheless, in the figures, for the clarity of the drawing, this condition has not been respected. At the locations of the cameras 2 and 3, the conveyor belt on one side of the camera is broken. In this way, for the camera 2 a space is provided facing the camera between the conveyor belts 9 and 10 in order to allow this camera to check the upper face of the sheet 1. In this gap between conveyor belts 9 and 10 the sheet 1 is held against the conveyor belt 8 by suction. For this purpose, a chamber 14 connected by a source of partial vacuum (not represented) is beneath the belt 8 which is equipped with holes in communication with the chamber 14 to allow the sheet 1 to be held truly flat on its surface. The belt slides over the edge of the chamber 14 to ensure good belt/chamber sealing and limits losses in depression.

In the same way, when the sheet passes facing the camera 3, a space corresponding to the length of the sheet exists between the conveyor belts 8 and 11 in order to allow the image printed on the other face of the sheet 1 to be checked. When the sheet passes in front of the camera 3, it is held against the conveyor belt 10 by means of a second chamber 15 connected to a source of partial vacuum, the belt also being equipped with holes in communication with the chamber 15.

Figure 2A:
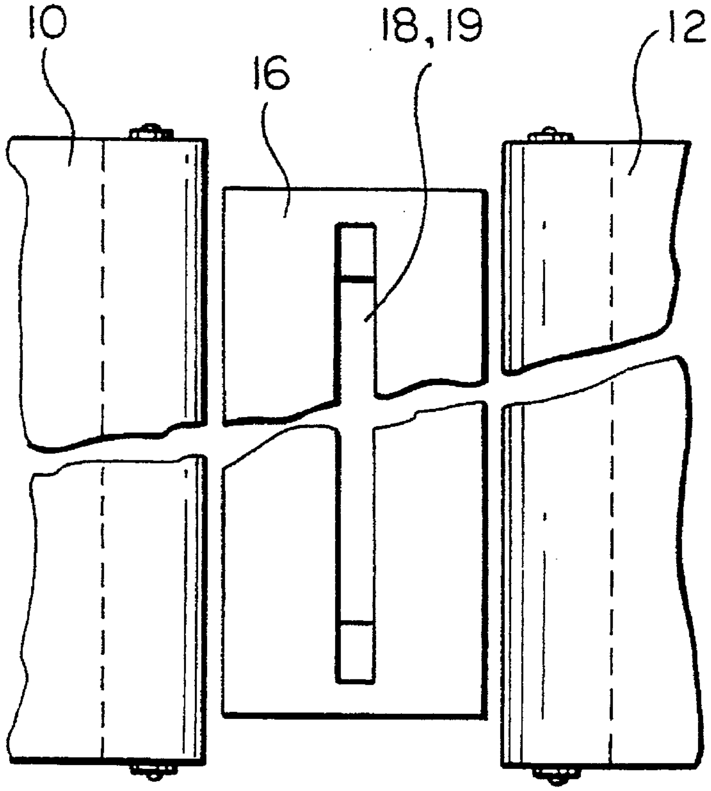
FIG. 2*a* shows an enlargement of the location for checking using transparency.

For the quality check using transparency, facing the camera 6 each of the plates 16, 17 is equipped respectively with a narrow slit 18, 19 pointing perpendicularly to the direction of travel in order to allow the transparency check. See FIGS. 2*a* and 2*b*. FIG. 2*c* shows a lateral view of the device shown in FIG. 2*a*. FIG. 2*d* shows a bottom view of the same device.

Figure 2B:
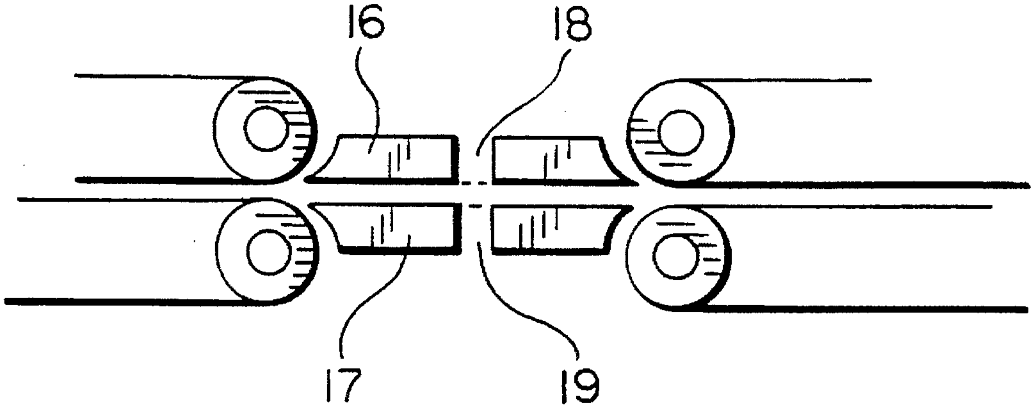
FIG. 2*b* is a plan view of the preceding figure.

The difference in relation to the device of FIG. 2*a* and 2*b* is the two lateral guides S1, S2 fixed on the lower plate 17 by means of nuts B1, B2 screwed on threaded stems integral with guides S1, S2 and passing through slit 19. It is easy to change the distance between guides S1, S2 to adapt to the sheet width passing between plates 16, 17.

According to a preferred alternative embodiment, in this chamber for checking the quality using transparency, means are provided for guiding the lateral ends of the sheet in order to prevent the sheet from becoming crooked between the two plates 16 and 17. These lateral guiding devices may be simple slideways which can be moved perpendicularly to the direction of travel of the sheet to allow them to be adapted to the width of the sheet to be checked.

An alternative embodiment will now be described with the aid of FIG. 3.

Figure 3:
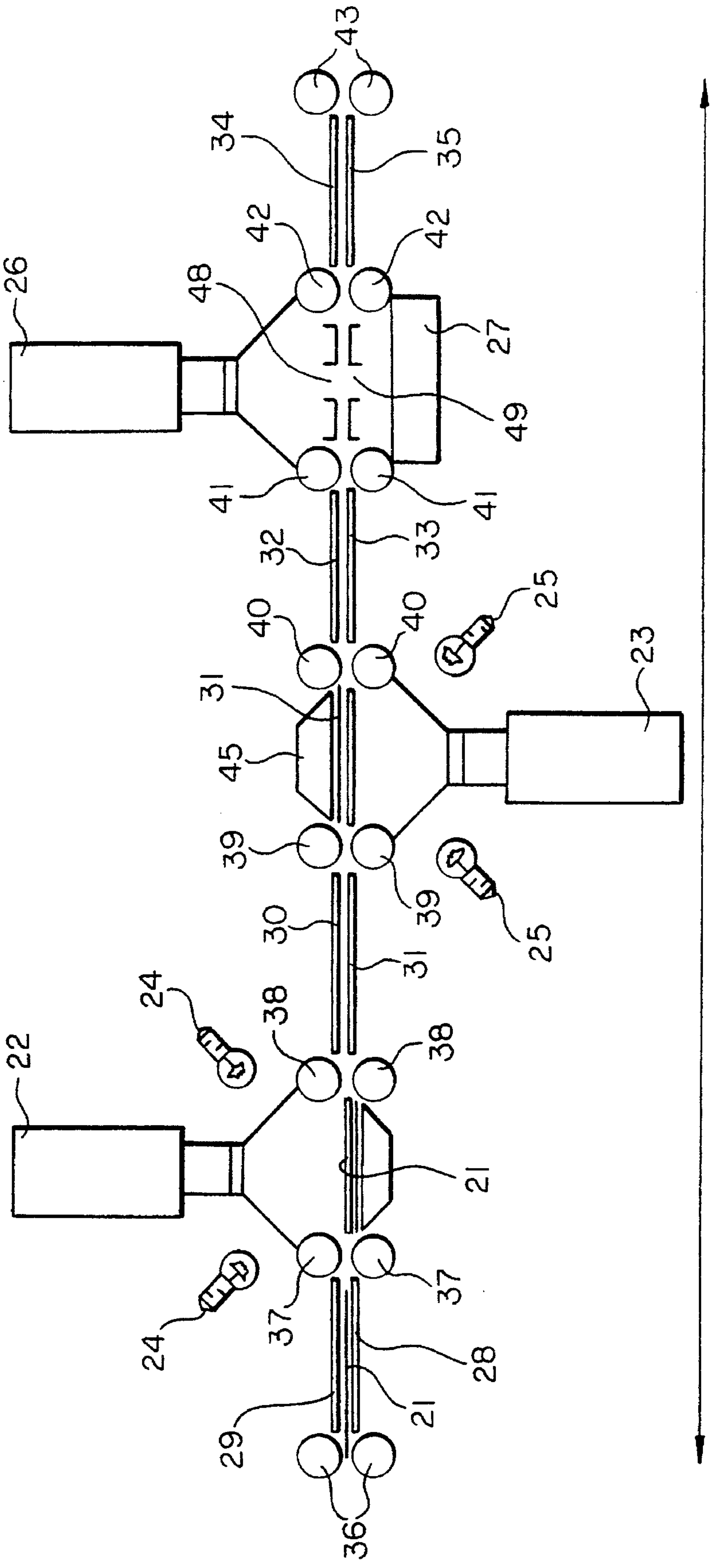
FIG. 3 is a diagrammatic side view of an installation according to the present invention, the transport means being guide plates and superposed rollers.

The device of FIG. 3 is similar to that of FIG. 1 except that the means for transferring the sheets are composed of guide plates and of rollers. In this device too, two cameras 22 and 23 are arranged for checking the print quality on each of the faces of a sheet 21, illuminating means 24 and 25 providing the illumination of each of the faces of the sheet to be checked, while a camera 26 for the transparency check with a light source 27 are also provided. The transfer means are composed on the one hand, of the plates 28, 29, 30, 31, 32, 33, 34, 35 and of pairs of rollers 36, 37, 38, 39, 40, 41, 42 and 43 whose longitudinal spacing is less than the length of a sheet 21. The role of the plates is to make sure that the printed sheets travel completely flat and the rollers 35 to 42 provide for the forward travel of the sheet. Two superposed rollers and two superposed plates are in contact and are made of or covered with an elastic substance thus allowing the sheets to be transported flat. Nevertheless, for the clarity of the drawing, this condition has not been respected. Facing each of the cameras 22 and 23 there is no plate between the face of the sheet 21 to be checked and the camera, precisely in order to allow the image to be checked using reflection. The plate on the other side of the camera is perforated and equipped with a chamber 44, 45 respectively, connected to a source of partial vacuum and sucks the sheet in order to keep the latter completely flat against it. The sheet 21 slides over said plate pushed by the rollers 37 and pulled by the rollers 38, respectively 39 and 40.

The transparency check in front of the camera 26 is also done in the same way as for the device 1 by means of superposed plates 46, 47 which leave checking slits 48, 49 between them.

Figure 4:
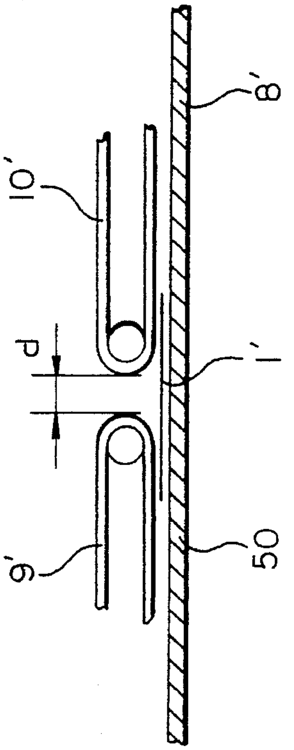
FIG. 4 is a partial view of a preferred embodiment.

FIG. 4 represents the preferred embodiment, that is to say the installation with slits for the check using reflection, the length of which slits corresponds to a fraction of the length of the sheet, usually 2–3 cm, allowing good illumination of the zone to be checked. Of course, this possibility is offered by the use of a linear (line by line) array camera in step with the forward travel of each sheet. Conveyor belts 8', 9' and 10' have therefore been represented, the spacing d between the belts 9' and 10' being merely a fraction of the length of the sheet. Of course, the same arrangement may be used for the second window and also for the embodiment of FIG. 3.

Also represented on the belt 8' are inclined holes 50 making it possible to have an optically homogeneous plane because parasitic light cannot penetrate via the lower end of the holes and the incident light reflected is the same color over the whole of the surface resting on the belt. That is to say that the fact that there are holes on the belt has no effect on the reflected light, by comparison with a belt without holes. The inclination of the holes may be 30–45 degrees.

The means described for holding the sheets facing the cameras using suction for the checking using reflection are merely an example, and other embodiments are possible.

I claim:

1. An installation for quality control of printed sheets including security paper, each having a top and bottom face comprising means for transferring said sheets and means for checking the print quality of each sheet, said means for transferring being constructed to transport said sheets in a plane to permit said means for checking to check on the print quality of each of the faces of the sheet in a single pass, the means for checking comprises:

first and second cameras (2, 3; 22, 23) located on opposite sides of said plane respectively at two offset locations along said plane, said first and second cameras being used to check the print quality of the top and bottom faces of a check using reflection, the means for transferring having an open window adjacent a front of each camera to allow said first said second cameras to check the quality of the corresponding front and bottom faces using reflection while the sheet (1; 21) is kept flat facing said camera (2, 3; 22, 23); and a third camera (6; 26) for checking the print quality of the sheet using transparency, the means for transferring having a slit (18, 19) facing the third camera (6; 26), wherein the means for transferring comprises a plurality of superposed conveyor belt devices (8, 9, 10, 11, 12, 13; 8', 9', 10') between which the sheets (1; 1') travel, said plurality of conveyor belts include first and second conveyor belts (8, 10; 10') that extend over a length corresponding to a length of the windows adjacent said first and second cameras, said means for transferring (8, 10; 28, 31; 8') holding the sheet by suction being equipped with holes (50) having an axis which is inclined relative to the transport plane, wherein said installation further comprising suction means for holding the sheet (1;1') flat against said first and second conveyor belts and facing said cameras, said installation further comprising a pair of superimposed plates (16, 17) positioned in front of said third camera (6) for keeping the sheet (1) to be checked flat, said plates having a slit (18, 19) for the checking the print quality by transparency, said slit being arranged perpendicularly to the direction of travel of the sheets, wherein said first, second and third cameras (2, 3, 6; 22, 23, 2) being linear array cameras and wherein the window adjacent to the side of each camera (2, 3; 22, 23) having a length corresponding to a fraction of the length of the sheet (1, 21) to be checked.

2. The installation as claimed in claim 1 further comprising means positioned in front of said camera (6, 26) for guiding the lateral edges of the sheets.

3. The installation as claimed in claim 1, wherein the inclination lies between 30° and 45°.

4. An installation for quality control of printed sheets including security paper, each having a top and bottom face comprising means for transferring said sheets and means for checking the print quality of each sheet, means for transferring constructed to transport said sheets in a plane to permit said means for checking to check on the print quality of each of the faces of the sheet in a single pass, the means for checking comprises:

first and second cameras (2, 3; 22, 23) located on opposite sides of said plane respectively at two offset locations along said plane, said first and second cameras being used to check the print quality of the top and bottom faces of a check using reflection, the means for transferring having an open window adjacent a front of each camera to allow said first said second cameras to check the quality of the corresponding front and bottom faces using reflection while the sheet (1; 21) is kept flat facing said camera (2, 3; 22, 23); and a third camera (6; 26) for checking the print quality of the sheet using transparency, the means for transferring having a slit (18, 19) facing the third camera (6; 26), wherein the means for transferring comprises a plurality of superposed guide plates (28–35) and pairs of rollers (36–43) for the entrainment of the sheets, said pairs of rollers being spaced longitudinally by a distance less than the length of the sheets to be checked, one of said plurality of plates being positioned in front of each of said cameras (22,23) and over a length corresponding to said window includes suction means for holding said sheet (21) flat facing said camera, said installation further comprising a pair of superposed plates (46, 49) in each of plate (46, 47) positioned in front of the camera (26) for allowing the transparency check, and wherein said slit being arranged perpendicularly to the direction of travel of the sheets, said first, second and third cameras (2, 3, 6; 22, 23, 2) being linear array cameras and wherein the window adjacent to the side of each camera (2, 3; 22, 23) has a length corresponding to a fraction of the length of the sheet (1, 21) to be checked, said means for transferring (8, 10; 28, 31; 8') holding the sheet by suction being equipped with holes (50) having an axis which is inclined relative to the transport plane.

5. The installation as claimed in claim 4 further comprising means positioned in front of said camera (6, 26) for guiding the lateral edges of the sheets.

6. An installation for quality control of printed sheets, each having a top and bottom face comprising means for transferring said sheets and means for checking the print quality of each sheet, means for transferring being constructed to transport said sheets in a plane to permit said means for checking to check on the print quality of each of the faces of the sheet in a single pass, the means for checking comprises:

first and second cameras (2, 3; 22, 23) located on opposite sides of said plane respectively at two offset locations along said plane, said first and second cameras being used to check the print quality of the top and bottom faces of a check using reflection, the means for transferring having an open window adjacent a front of each camera to allow said first said second cameras to check the quality of the corresponding front and bottom faces using reflection while the sheet (1; 21) is kept flat facing said camera (2, 3; 22, 23); and a third camera (6; 26) for checking the print quality of the sheet using transparency, the means for transferring having a slit (18, 19) facing the third camera (6; 26), wherein said first, second and third cameras (2, 3, 6; 22, 23, 2) are linear array cameras and wherein the window adjacent to the side of each camera (2, 3; 22, 23) has a length corresponding to a fraction of the length of the sheet (1, 21) to be checked, wherein said means for transferring (8, 10; 28, 31; 8') holding the sheet by suction are equipped with holes (50) having an axis which is inclined relative to the transport plane.

7. The installation as claimed in claim 6 wherein the inclination lies between 30 degrees and 45 degrees.

* * * * *